Dec. 31, 1968  YASUMASA TAKANO ET AL  3,419,880
X-RAY DIFFRACTION RECORDING SYSTEM
Filed Dec. 16, 1966
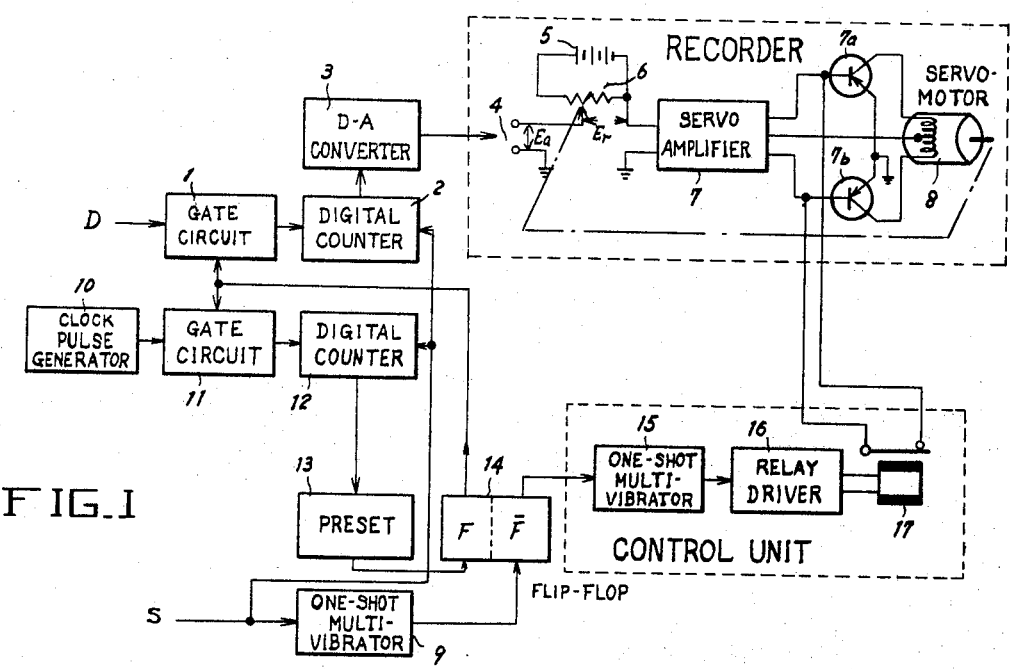
FIG.1
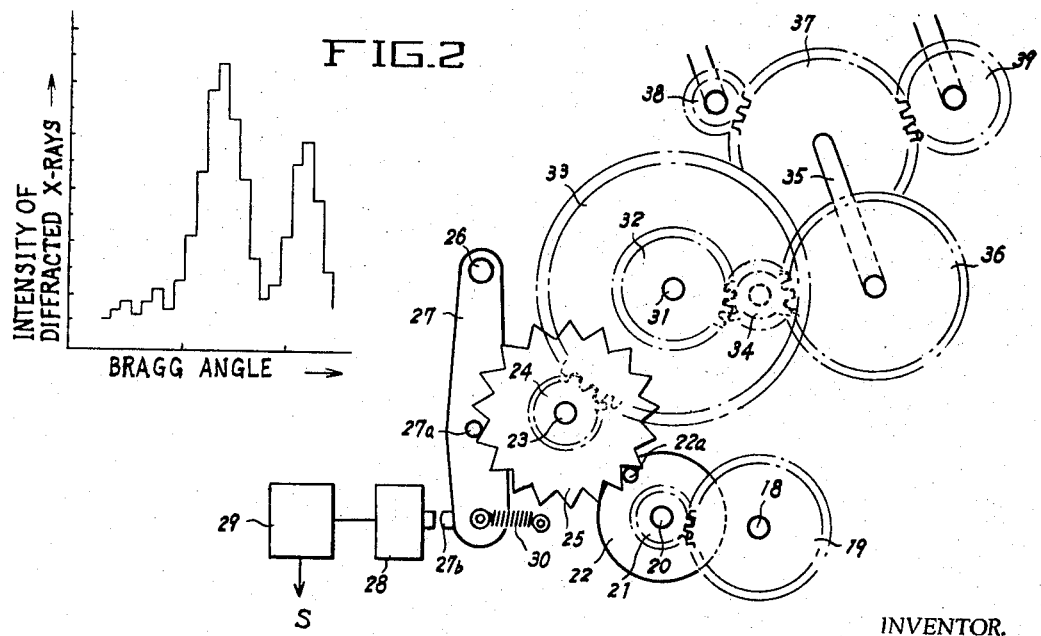
FIG.2
FIG.3
INVENTOR.
Y. Takano
BY H. Miura
T. Yamamoto United States Patent Office 3,419,880
Patented Dec. 31, 1968

3,419,880
X-RAY DIFFRACTION RECORDING SYSTEM
Yasumasa Takano, Hitoshi Miura, and Tadamasa Yamamoto, Tokyo, Japan, assignors to Nihon Denshi Kabushiki Kaisha, Tokyo, Japan, a corporation of Japan
Filed Dec. 16, 1966, Ser. No. 602,271
Claims Priority, application Japan, Dec. 17, 1965, 40/77,751
8 Claims. (Cl. 346—33)

ABSTRACT OF THE DISCLOSURE

A step scan recording apparatus and method for measuring X-ray diffraction intensities. The apparatus has a mechanism that controls a goniometer and initiates a pulse that is transmitted to a counter circuit. The counter circuit remains open after being initiated by the pulse for a predetermined time in which it digitally counts signals generated by a detector. The digital count is converted to an analog voltage that is used to drive a servomotor that is geared to a recording pen and potentiometer. The servomotor is controlled by the potentiometer and a control circuit, such that the recording pen plots the relation between the intensity of diffracted X-rays and the Bragg angle.

---

Conventional X-ray diffractometers measure the relative intensities of lines on the diffraction pattern obtained by the intermittent movement of a goniometer through the measuring angles. Measuring the relative intensities, rather than the intensities themselves, eliminates the probable error that is dependent upon intensities of the diffracted X-rays. Since X-ray quanta are emitted in a random manner, certain statistical rules are considered in measuring the intensities. One method is to use a scaling circuit to measure the count during a predetermined time interval, thereby determining the counting rate. However, the error obtained in this manner is dependent upon the counting rate. Therefore, in order to have an error that is independent of the counting rate, the count or number of X-ray quanta is predetermined and the time is varied. The principle of the conventional apparatus is based on the fact that the time required to totalize a predetermined count can be converted into a form of resistance by means of a motor driven helical potentiometer and the voltage thus developed is then recorded. However, the conventional apparatus necessitates the inclusion of a computer to determine the electrical current requirements to operate the recording pen. The necessity for a computer makes the overall apparatus very complex and highly expensive.

It is, therefore, the object of the present invention to eliminate the complexity and expense involved by providing an X-ray diffractometer with a simple step scan recording system.

Our apparatus has a start pulse generating means wherein a driveshaft is continuously rotated by a motor. A gear disposed upon the driveshaft imparts rotation to another gear to which is concentrically disposed a disc provided with a pin that is in communication with a step gear such that the rotational motion is translated into an intermittent ratchet motion. The intermittent ratchet motion is transmitted to a gear means that causes the position of an X-ray detector to change at the same time as the angle of the specimen is changed. The intermittent ratchet motion is also used to engage a contact with a microswitch such that a pulse is created; that is, a equi-spaced start pulse is created for each change of the detector and specimen.

The start pulse activates a counter circuit. The counter circuit includes digital counters such that at least one digital counter is used to count out clock pulses created by a clock pulse generator wherein a predetermined number of clock pulses fixes the time in which the counter circuit remains activated. Another counter is utilized to count the signal pulses from the detector of the X-ray diffractometer. The count from the digital counter in the detector circuit is converted to an analog voltage. This voltage is transmitted to a recorder circuit such that there is created a potential difference between that voltage and the voltage in the recorder circuit. The potential difference is amplified and fed to a servomotor. The servomotor is geared to a recording pen and to a potentiometer within the recording circuit. As the servomotor operates, it causes the potentiometer to redefine the potential difference so that it approaches zero. The recording circuit, however, is controlled by a control circuit so that it operates only after the counter circuit has counted out the predetermined clock pulses. The servomotor is off during the count of the signals from the detector and during the predetermined time interval necessary to make that count.

In the accompanying drawings, we have shown one preferred embodiment of our invention in which:

FIGURE 1 is a block diagram of the electrical circuit;
FIGURE 2 is an example of a diffraction pattern recorded by the apparatus; and
FIGURE 3 is a perspective view of the start pulse generating mechanism.

Referring to FIGURE 1, start pulses S, derived from a pulse forming circuit 29 (FIGURE 3), are fed into a one-shot multivibrator 9 and digital counters 2 and 12, where the time interval between start pulses is more than 30 seconds.

The one-shot multivibrator is designed so as to make a delayed pulse corresponding to the start pulse, where the time delay of the resulting pulse is equal to the time required to reset the digital counters 2 and 12. The delayed pulse from multivibrator 9 is fed to a flip-flop circuit 14, causing the left portion F of the flip-flop circuit 14 to go OFF and the right portion $\overline{F}$ to come ON. Gate circuits 1 and 11, which are normally closed, are opened by the output voltage from the F portion of the flip-flop circuit.

During the time interval that gate circuit 1 is open, signals D detected by detector (not shown) pass through the gate and are counted by digital counter 2.

Pulses derived from a clock-pulse generator 10 incorporating a crystal oscillator that have precise time intervals pass through gate circuit 11 after which they enter digital counter 12. When the digital counter 12 counts a predetermined number of pulses, preset circuit 13 feeds a pulse to the flip-flop circuit 14.

The pulse generated in preset circuit 13 is fed to the flip-flop circuit 14, in which the ON–OFF condition is caused to be reversed. Therefore, as the left portion F of the flip-flop circuit 14 comes ON, the output that had been applied to gate circuits 1 and 11 disappears and the gate circuits are closed. In other words, gate circuits 1 and 11 remain closed until the next delayed pulse is applied to flip-flop circuit 14.

In this case, the time interval between the pulses generated in the preset circuit must be set so as to be shorter than the time interval for the start pulses. A shorter interval is required for the time interval is longer than that for the start pulses, the subsequent start pulses enter one-shot multivibrator 9 and the delayed pulse is fed to the flip-flop circuit 14 before one cycle has been completed, where the expression "one cycle" refers to a complete cycle of processing when the electrical circuit operates in accord with one start pulse. A longer interval would mean that subsequent pulses would be, for all intents and purposes, useless, and furthermore, accurate measurement would be impossible.

During the time that gate circuit 1 is open, signals D counted by digital counter 2 are fed to a D–A (Digital-to-Analog) converter 3 that changes them into voltage $E_a$. Voltage $E_a$ is then applied to input terminal 4 of a recorder that records a diffraction pattern.

The difference in voltage between $E_a$ and $E_r$, where $E_r$ is the output voltage of a potentiometer circuit comprising a variable resistor 6 and a direct current source 5, is amplified by a servoamplifier 7 and power transistors 7a and 7b. The amplified voltage difference drives a servomotor 8. The variable resistor 6 of the potentiometer circuit is greared with the servomotor 8, such that the servomotor rotates until $E_a$ and $E_r$ are balanced (viz. $E_a - E_r = 0$).

Furthermore, in order to drive the servomotor 8 in accordance with flip-flop circuit 14, a relay 17 incorporated in the control unit to open and close contacts such that servomotor 8 is driven only when relay 17 contacts are open (in FIGURE 1, the contacts are closed). The control unit for the recorder comprises, in addition to relay 17, a one-shot multivibrator 15 and a relay driver 16.

When the right portion F of the flip-flop circuit 14 changes to the OFF condition, its output pulse is fed to one-shot multivibrator 15. The one-shot multivibrator produces an output pulse having a predetermined time duration, during which time it serves to operate the relay drive 16 so as to open the relay contacts.

Therefore, when relay 17 contact points are open, servomotor 8 is driven in accordance with the voltage difference between $E_a$ and $E_r$.

Consequently, the recording pen (not shown) driven by the servomotor scribes in proportion to the quanta of the input signal, at right angles to the movement of a recording chart.

Once the time duration of the one-shot multivibrator 15 output has elapsed, the contact points close and the recording pen remains stationary until the contact points are reopened. During the time that the recording pen remains stationary, it scribes a line parallel to the movement of the recording chart. In this way, a diffraction pattern is obtained as shown in FIGURE 2. The abscissa repersents a goniometer Bragg angle and the ordinate represents the intensity of diffracted X-rays.

In FIGURE 3 the mechanism which produces the start pulses S and gives intermittent ratchet movement in one direction to the goniometer is shown.

A spur gear 19 mounted on driving shaft 18 is rotated at a uniform speed by a motor (not shown). Spur gear 19 meshes with spur gear 21 that is connected to disc 22 by a common shaft 20. Disc 22 is provided with a pin 22a that meshes with step gear 25, such that one rotation of disc 22 advances the step gear 25 by one tooth.

In addition, step gear 25 is meshed with roller 27a attached to an arm 27. Arm 27 is moved to and fro about the supporting fulcrum 26 with each tooth advance of step gear 25. This action cause a contact 27b attached to the lower end of arm 27 to push a microswitch 28 that in turn operates a pulse forming circuit 29 that generates that start pulse. When step gear 25 stops, the arm 27 is retracted by spring 30, thereby disengaging contact 27b and the microswitch 28.

Furthermore, it is possible to do away with the spur gears 19 and 21 in this embodiment for attaining the same purpose, which in this case, disc 22 provided with pin 22a that is meshed with step gear 25 must be mounted on driving shaft 18.

A shaft 23 of step gear 25 also carries a small spur gear 24 (shown as a broken line) that serves to transmit an intermittent ratchet movement to spur gear 33 mounted on shaft 31. A spur gear 32 mounted on the shaft 31 transmits the intermittent ratchet movement of step gear 25 via an intermediate gear 34 to spur gear 36 mounted on shaft 35 on the opposite end of which is disposed spur gear 37.

The spur gear 37 is meshed with two spur gears 38 and 39, one of which is used for changing the tilting angle of the specimen, the other of which is used for rotating a detector.

In this arrangement of the invention, the continuous rotation of the motor is converted into an intermittent ratchet movement such as to generate start pulses S and thereby provide step scanning for the X-ray diffractometer.

While we have shown and described a preferred embodiment of our invention, it may be otherwise embodied within the scope of the appended claims.

We claim:
1. An apparatus for step scan recording in X-ray diffractometers having a movable specimen mount comprising;
   (A) at least two gate circuits,
   (B) a clock pulse generator connected to a first gate circuit,
   (C) a detector for receiving diffracted X-rays and producing a signal proportional in number to the intensity of the diffracted X-ray connected to a second gate circuit,
   (D) a circuit connected to the second gate circuit for counting signals produced by the detector and converting the total count to analog electrical values when said gate is open,
   (E) a recorder for recording said electrical values,
   (F) a means connected to the first gate circuit for counting the pulses from the clock pulse generator and for closing the gate circuits when the counted clock pulses reach a predetermined count, and,
   (G) a means for regulating the recorder to record the electrical values when the gate circuits are closed.

2. An apparatus as set forth in claim 1 wherein the means for counting the pulses from the clock pulse generator and for closing the gate circuit includes a start pulse circuit actuated by the means for moving the movable specimen mount.

3. An apparatus for step scan recording in X-ray diffractometers having a movable specimen mount comprising;
   (A) means for generating a start pulse,
   (B) a flip-flop circuit operated by said start pulse, whereby an output is created by a portion of said circuit,
   (C) at least two gate circuits opened by said output of the flip-flop circuit,
   (D) a clock pulse generator connected to one of said gates,
   (E) a movable X-ray diffraction detector producing signals proportional in number to the intensity of the diffracted X-rays connected to the other of said gates,
   (F) at least two digital counters, one of said counters counting signals from said detector which have passed through one of said gates when said gate is open, and the other digital counter counting pulses from said clock pulse generator passed through the other of said gates when said gate is open,
   (G) means for converting the digital count of said signals from said detector to an analog voltage,
   (H) means for recording said analog voltage,
   (I) control means for said means for recording whereby said means for recording is operable when said gates are closed,
   (J) a preset circuit that triggers a pulse to said flip-flop circuit when the digital counter that counts pulses from the clock pulse generator has reached a predetermined count said pulse causing said flip-flop circuit to reverse and its output to cease thereby closing said gates and further causing a pulse to be transmitted to said control means such that said means for recording is operable during that time when said digital counters are not counting and thus placing the apparatus in its initial condition such that it is receptive to another start pulse.

4. An apparatus claimed in claim 3 characterized by said means for generating a start pulse having;
(A) a rotatably mounted disc,
(B) means for rotating said disc,
(C) a pin disposed upon said disc,
(D) a step gear having teeth engaged by said pin upon rotation of the disc whereby said step gear is moved one tooth per revolution of the disc,
(E) a second gear mounted for rotation with said step gear and about the same axis,
(F) at least two gears in communication with said second gear where one of said gears is connected to said movable specimen mount and said other gear is connected to said movable detector whereby the movement of said step gear changes the position of said detector and said specimen mount,
(G) an arm having a pin disposed upon a fulcrum said pin being engageable by the teeth of said step gear,
(H) a spring resiliently pressing said pin into engagement with said teeth of the step gear whereby rotation of the step gear causes said arm to pivot with each advance of the step gear,
(I) a microswitch connected to said arm such that each pivoting movements of said arm operates the microswitch,
(J) a pulse circuit actuated by said microswitch such that each time the detector and the specimen mount are moved a start pulse is actuated.

5. An apparatus claimed in claim 3 and having a one-shot multivibrator connected to said means for generating a start pulse and said flip-flop circuit, where said start pulse actuates the multivibrator and at least two of said digital counters where said pulse causes the digital counters to reset and characterized by said one-shot multivibrator producing a delayed pulse such that said delay is equal to the time required to reset said digital counters and further characterized by said delayed pulse actuating said flip-flop circuit.

6. An apparatus claimed in claim 3 characterized by said control means having a one-shot multivibrator, a relay driver connected to said multivibrator, and a relay driven by said driver, where said multivibrator is actuated by said flip-flop circuit to produce an output pulse having a predetermined time duration such that during the time of said pulse said pulse operates said relay driver that opens the relay contacts thereby permitting said means for recording to record said analog voltage.

7. An apparatus claimed in claim 3 characterized by said means for recording said analog voltage comprising;
(A) a power source,
(B) a potentiometer connected to said power source creating a potentiometer-power source cricuit,
(C) a servoamplifier connected to said potentiometer-power source circuit,
(D) a servomotor operably connected to said potentiometer and electrically connected to said servoamplifier, whereby said analog voltage is impressed on the potentiometer-power source circuit such that a potential difference is created that is amplified by said servoamplifier that rotates said servomotor and where said rotation adjusts the potentiometer to eliminate the potential difference,
(E) a recording pen operably connected to said servomotor, where said recording pen scribes during the rotation of said servomotor.

8. An apparatus claimed in claim 7 characterized by said control means having a one-shot multivibrator, a relay driver connected to said multivibrator, and a relay connected to said servomotor and driven by said relay driver where said multivibrator is actuated by said flip-flop circuit to produce an output pulse having a predetermined time duration such that during the time of said pulse, said pulse operates said relay driver that opens the relay contacts such that during the time said contact is open the servomotor operates in accordance with said potential difference.

References Cited

UNITED STATES PATENTS 2,619,600 11/1952 Hamacher _____ 250—515
2,803,405 8/1957 Howell _____ 235—92

RICHARD B. WILKINSON, *Primary Examiner.*

J. W. HARTARY, *Assistant Examiner.*

U.S. Cl. X.R.

235—92; 250—51.5, 83.6